United States Patent [19]

Tanaka et al.

[11] Patent Number: 5,033,299
[45] Date of Patent: Jul. 23, 1991

[54] FLOW SENSOR

[75] Inventors: Junichi Tanaka, Tenri; Akihito Jinda, Nara; Nobuyuki Tanaka, Soraku; Yasuhiko Inami, Nara, all of Japan

[73] Assignee: Sharp Kabushiki Kaisha, Osaka, Japan

[21] Appl. No.: 388,334

[22] Filed: Aug. 1, 1989

[30] Foreign Application Priority Data

Aug. 4, 1988 [JP] Japan ................................. 63-195426

[51] Int. Cl.5 .............................................. G01F 1/68
[52] U.S. Cl. .................................................. 73/204.26
[58] Field of Search ........... 73/204.17, 204.25, 204.26, 73/204.27, 204.16

[56] References Cited

U.S. PATENT DOCUMENTS

| 4,304,130 | 12/1981 | Peter et al. | 73/204.26 |
|---|---|---|---|
| 4,399,697 | 8/1983 | Kohama et al. | 73/204.26 |
| 4,549,433 | 10/1985 | Gneiss et al. | 73/204.26 |
| 4,559,814 | 12/1985 | Sato et al. | 73/204.27 |
| 4,761,995 | 8/1988 | Ohta et al. | 73/204.17 |
| 4,881,407 | 11/1989 | Tashahashi et al. | 73/204.25 |

Primary Examiner—Herbert Goldstein
Attorney, Agent, or Firm—Irell & Manella

[57] ABSTRACT

A flow sensor comprising a heating unit and a fluid temperature detecting unit, the heating unit including a heat element, the fluid temperature detecting unit including a fluid temperature detecting element, the elements being formed on at least one substrate made of zirconia that is a heat insulating material having low thermal conductivity, great mechanical strength, and high heat-resistance.

13 Claims, 2 Drawing Sheets

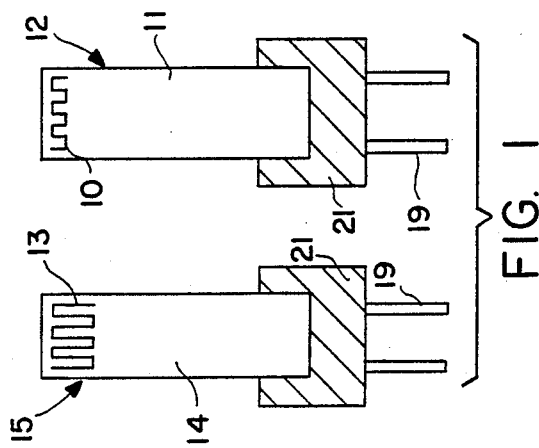
FIG. 1
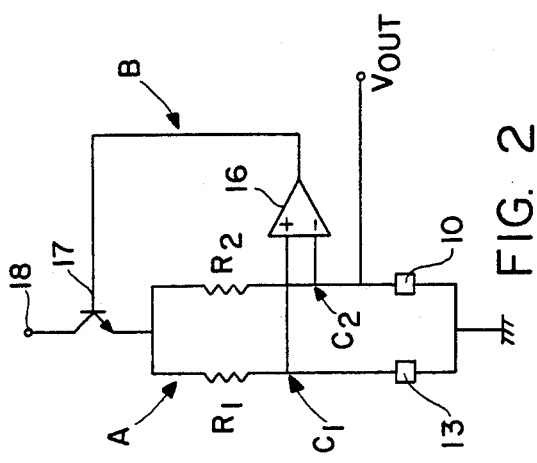
FIG. 2
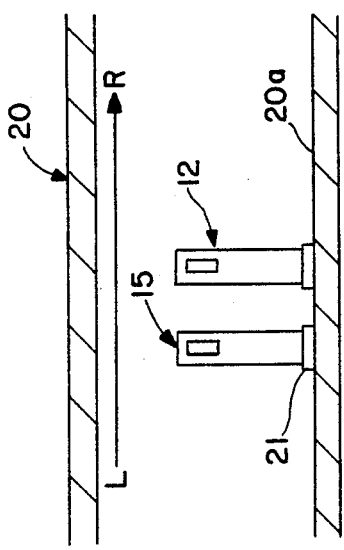
FIG. 3
| | FREXURAL STRENGTH (kg/mm2) | THERMAL CONDUCTIVITY (cal/cm·s·°C) |
|---|---|---|
| ZIRCONIA | 120 | $4.6 \times 10^{-3}$ |
| QUARTZ GLASS | 7 | $3.3 \times 10^{-3}$ |
| ALUMINA | 25 - 55 | $8.6 \times 10^{-2}$ |
FIG. 4

:
FLOW SENSOR

BACKGROUND OF THE INVENTION

1. Field of the Invention

This invention relates to a flow sensor that comprises a heating element and a fluid temperature detecting element, which are formed on at least one substrate.

2. Description of the Prior Art

A conventional flow sensor comprises a heater, which is placed within a bypass flow tube connected to a main flow tube. A part of the main flow of fluid is directed to the bypass flow tube in which the fluid is heated by the heater. The flow rate is determined by the fluid-temperature distribution in the direction of the flow in the bypass flow path. A flow sensor of this type can detect the flow rate accurately so that it is widely used as a mass-flow controller for semiconductor gases, or the like. This flow sensor, however, is not suited for miniaturization or mass production because it requires a bypass flow tube, which makes the whole structure of the sensor complicated. Moreover, its production cost is so high that it can only be applied to a limited field.

Another conventional flow sensor comprises a heating element and a fluid temperature detecting element which are placed within a flow path. The heating element heats fluid around it and the amount of heat transferred from the heating element to the fluid is detected by the fluid temperature detecting element. The detected value is used to determine the flow rate of the fluid. In a flow sensor of this type, the difference in temperature between the fluid and the heating element is maintained at a fixed level, so as to compensate for the influence of the fluid temperature on the value of the flow rate to be detected. The output of the flow sensor can be enhanced by setting the above-mentioned difference in temperature at a high level.

In one of the flow sensors of this type, there is a flow sensor comprising a heating transistor and a fluid temperature detecting transistor, both of which are formed on a silicon chip. This flow sensor can be mass-produced by the use of a silicon processing technique, but it is disadvantageous in that the temperature characteristics vary between the sensors. Thus, it is difficult to obtain sensors having the desired temperature characteristics.

Resistor wires made of materials having high melting points such as platinum, tungsten, or the like, are often used as the heating element and the fluid temperature detecting element for this type of flow sensor, but the resistance of the wire made of these materials is small and varies between the elements, so that adjustability of the heating temperature and accuracy of the temperature measurement of the sensor are poor. It is also disadvantageous in that a sensor of this type requires fine wires of platinum, tungsten, or the like, which are extremely difficult to produce and thus cannot be mass-produced.

In order to overcome the above-mentioned problems, a thermal film-type flow sensor comprising a thin-film heating element and a thin-film fluid temperature detecting element that are respectively formed on two separate heat-insulating substrates has been proposed. This type of flow sensor can be miniaturized by the use of a fine patterned thin metal film. Moreover, this flow sensor can be obtained by a process in which a single substrate having a number of thin-film elements formed thereon are cut out into each unit, resulting in a number of units with uniform characteristics at the same time. Thus, the sensor can be readily mass-produced with uniform sensor-characteristics.

FIG. 9 shows the above-mentioned thermal thin-film type flow sensor fixed within a flow path 1. Fluid flows from the direction L toward the direction R within the flow path 1. A fluid temperature detecting unit 2 is disposed upstream of a heating unit 3, so that the fluid temperature detecting unit 2 may not be directly influenced by the heat of the heating unit 3. Both the units 2 and 3 comprise lead terminals, which are mechanically and electrically connected to sockets 5 via supports 4. The sockets 5 are attached to the wall 1a of the flow path 1. In this flow sensor, when the temperature of the wall 1a is different from that of the fluid, heat travels to and from between the wall 1a and the fluid temperature detecting unit 2 via the supports 4. This prevents the accurate measurement of the fluid temperature with use of the fluid temperature detecting unit 2. Also in this sensor, the heat of the heating unit 3 tends to be conducted through the supports 4 to the wall 1a, from which the heat is then transferred to the fluid temperature detecting unit 2. This prevents the fluid temperature detecting unit 2 from detecting the temperature of the fluid with accuracy.

To solve this problem, a flow sensor shown in FIG. 10, in which the units 2 and 3 are directly connected to the socket 5 on the wall 1a without the supports 4, has been proposed. Thus, the substrates, on each of which the thin-film heating element and the thin-film fluid temperature detecting element are respectively formed, are connected to the sockets 5 without the supports 4. In this flow sensor, heat does not travel between the fluid temperature detecting unit 2 and the wall 1a, and heat of the heating unit 3 is not conducted to the wall 1a, because heat-insulation effect is obtained between the heating element and the wall 1a and also between the fluid temperature detecting element and the wall 1a due to the heat-insulating substrates.

As materials for the substrate, materials having high thermal conductivity, i.e., silicon, alumina, or the like are often used. In such a case, in order to obtain sufficient heat-insulation effect between the two elements and the wall 1a, the substrates should be made larger in size because of their high thermal conductivity. In order to make the substrates smaller in size, glass, which has low thermal conductivity, has been proposed as a material for the substrate (Preprints on the sixth symposium "Basics and Application of Sensors" sponsored by Electronic Device Technique Committee of Electrical Society, pp. 95–96). When glass is used as the material for the substrates, they can be made smaller because sufficient heat-insulation effect can be obtained between the elements and the wall 1a even with smaller substrates due to their low thermal conductivity. Glass is also advantageous in that it is inexpensive and the substrates made of it can be used under a relatively wide variety of environmental conditions. Glass, however, has only a small mechanical strength, so that it is difficult to process glass into a substrate, and the substrate made of it is fragile and difficult to handle. Glass does not have sufficient heat-resistance, so that the glass substrate cannot be used in a high-temperature atmosphere, and the sensor comprising the glass substrate cannot be cleaned by being heated by its heating element.

SUMMARY OF THE INVENTION

The flow sensor of this invention, which overcomes the above-discussed and numerous other disadvantages and deficiencies of the prior art, comprises a heating unit and a fluid temperature detecting unit, said heating unit including a heating element, said fluid temperature detecting unit including a fluid temperature detecting element, said elements being formed on at least one substrate made of zirconia that is a heat insulating material having low thermal conductivity, great mechanical strength, and high heat-resistance.

In a preferred embodiment, the heating unit further includes a heating temperature detecting element for detecting the temperature of said heating element.

In a preferred embodiment, the heating element and said fluid temperature detecting element are respectively formed on two separate substrates, at least one of said substrates being made of zirconia.

In a preferred embodiment, the zirconia is a pure zirconia or zirconia ceramic.

In a more preferred embodiment, the zirconia ceramic is stabilized zirconia that is produced by the addition of a stabilizer of $Y_2O_3$, CaO, or MgO, to said pure zirconia.

In a more preferred embodiment, the zirconia ceramic is partially-stabilized zirconia that is produced by the addition of a smaller amount of said stabilizer to said pure zirconia.

Thus, the invention described herein makes possible the objectives of (1) providing a flow sensor of a reduced size for detecting the rate of flow with accuracy; (2) providing a flow sensor that can be readily mass-produced and can be used under a wide variety of environmental conditions; (3) providing a flow sensor that can be used in a high-temperature atmosphere; and (4) providing a flow sensor that can be cleaned by being heated by its heating element.

BRIEF DESCRIPTION OF THE DRAWINGS

This invention may be better understood and its numerous objects and advantages will become apparent to those skilled in the art by reference to the accompanying drawings as follows:

FIG. 1 is a sectional side elevation showing a flow sensor of this invention.

FIG. 2 is a circuit diagram of the flow sensor shown in FIG. 1.

FIG. 3 is a sectional side elevation of the flow sensor of this invention placed within a flow path.

FIG. 4 is a table indicating the properties of the materials used for substrates of a conventional flow sensor and of a flow sensor of this invention.

DESCRIPTION OF THE PREFERRED EMBODIMENTS

Figure 5:
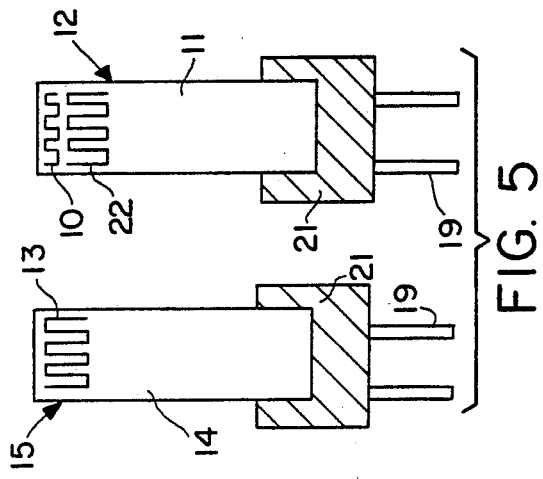
FIG. 5 is a sectional side elevation showing another flow sensor of this invention.

FIG. 1 shows a flow sensor of this invention, which is a thermal film-type flow sensor, comprises at least two units, i.e., a heating unit 12 and a fluid temperature detecting unit 15. The heating unit 12 includes a heating element 10 formed on a first heat-insulating substrate 11 and the fluid temperature detecting unit 15 includes a fluid temperature detecting element 13 formed on a second heat-insulating substrate 14. The first and the second substrates 11 and 14 that are rectangular in shape are made of zirconia, which is a heat-insulating material with low thermal conductivity and has high mechanical strength and excellent heat-resistance.

The heating unit 12 and the fluid temperature detecting unit 15 each has a pair of lead terminals 19 attached thereto, through which the output from the heating element 10 and the fluid temperature detecting unit 15 is delivered. The lead terminals 19 pass through a box-shaped socket 21, which is attached to the fluid-path wall 20a as shown in FIG. 3, so as to mechanically connect the heating unit 12 and the fluid temperature detecting unit 15 to the wall 20a.

The heating element 10 and the fluid temperature detecting element 13 are formed as follows: On each of the first and second substrates 11 and 14, a thin metal film of platinum or the like having a high resistance temperature coefficient is formed by the vacuum vapor deposition method, the spattering method, plasma assisted chemical vapor deposition, or the like. Then, the thin metal film is patterned by an etching technique, and is adjusted to have a predetermined resistance by means of a laser trimming apparatus, resulting in, as shown in FIG. 1, the heating element 10 and the fluid temperature detecting element 13.

The heating element 10 and the fluid temperature detecting element 13 are connected to electrical resistors $R_1$ and $R_2$, respectively, resulting in a bridge circuit A as shown in FIG. 2. The bridge circuit A is connected to a feedback circuit B including an amplifier 16 and a transistor 17. The difference in voltage between a connection point C1 (between the resistor $R_1$ and the fluid temperature detecting element 13) and a connection point C2 (between the resistor $R_2$ and the heating element 10) is amplified by the amplifier 16 so that the base potential of the transistor 17 is controlled, allowing the transistor 17 to be driven. The emitter terminal of the transistor 17 is connected to both of the electrical resistors $R_1$ and $R_2$. The transistor 17 is also connected to an input terminal 18.

The flow sensor of this example is produced as follows: First, in the same way as described above, thin metal films of platinum or the like are formed on a substrate and patterned by an etching technique, and adjusted to have a predetermined resistance, resulting in a plurality of the heating elements 10 or the fluid temperature detecting elements 13 formed on the single substrate. Then, the substrate on which the elements 10 or 13 have been formed is cut out into a plurality of heating units 12 or fluid temperature detecting units 15. These units 12 and 15 are as small as several millimeters in size, so that they can be obtained by a batch process by which a number of units 12 or 15 are produced at the same time with uniform characteristics. A flow sensor of this example comprises one of the resultant heating units 12 and one of the fluid temperature detecting units 15.

When the flow sensor is placed within the flow path 20 through which the fluid flows from the direction of L toward the direction of R as shown in FIG. 3, the fluid temperature detecting unit 15 is disposed in the upstream of the heating unit 12, so that the fluid temperature detecting unit 15 may not be influenced by the heat of the heating unit 12 when it detects the temperature of the fluid.

The operation of the flow sensor of this example will now be described. First, the transistor 17 is turned on to receive electric current through the input terminal 18, which electrifies the heating element 10, so that the heating element 10 generates heat. When the flow rate of the fluid is high, a large amount of heat is transferred from the heating element 10 to the fluid. On the contrary, when the flow rate of the fluid is low, a small amount of heat is transferred from the heating element 10 to the fluid. The temperature of the fluid is detected by the fluid temperature detecting element 13, and the difference in temperature between the fluid and the heating element 10 is maintained at a fixed level with the aid of the feedback circuit B; that is, the feedback circuit B controls current that is applied to the heating element 10 in such a manner that the current is increased when the flow rate is high and it is decreased when the flow rate is low. Accordingly, the level of voltage Vout obtained at the heating element 10 changes with the flow rate, so that the flow rate of the fluid can be determined by changes in the voltage Vout.

Referring to the table shown in FIG. 4, the thermal conductivity of zirconia, which is used as the material for the heat-insulating substrates 11 and 14 in this example, is $4.6 \times 10^{-3}$ cal/cm.s.C. This is by far lower than the thermal conductivity of alumina and silicon, which are often used as the material for the heat-insulating substrates of a conventional flow sensor. When the thermal conductivity of the material for the substrate is as high as that of alumina or silicon, the heat generated by the heating element is readily conducted through the substrate to the wall of the flow path, from which the heat is directly conducted to the fluid temperature detecting unit. This interferes with the accurate measurement with use of the fluid temperature detecting unit. Thus, in this case, in order to prevent the heat from being conducted to the wall of the flow path, the substrate should be made large in size. On the other hand, the thermal conductivity of zirconia is extremely small as described above, so that heat generated by the heating element is not conducted to the flow-path wall even though the substrate is made smaller in size.

Zirconia is also excellent in mechanical strength. In particular, its flexural strength is as great as 120kg/mm$^2$, which is by far greater than that of quartz glass and alumina as shown in the table of FIG. 4, so that it is easy to handle in the production process, resulting in a high yield. The great flexural strength of zirconia also makes it possible to use a flow sensor under a wider variety of environmental conditions.

Moreover, zirconia has such a high heat-resistance that a flow sensor comprising zirconia substrates can be used in a high-temperature atmosphere and also can clean itself by the heat of its heating element.

Zirconia used as the material for the substrates of the flow sensor of the invention is not limited to a pure zirconia; it can also be a zirconia ceramic, i.e., a stabilized zirconia which is produced by the addition of a stabilizer such as $Y_2O_3$, CaO, MgO, or the like to the pure zirconia, or a partially-stabilized zirconia which is produced by the addition of a smaller amount of the above-mentioned stabilizer to the pure zirconia.

Figure 6:
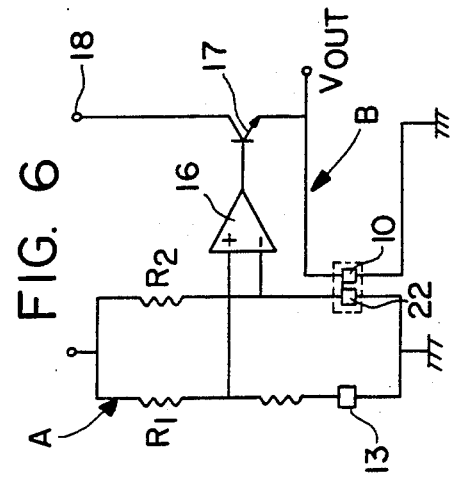
FIG. 6 is a circuit diagram of the flow sensor of FIG. 5.

FIG. 5 shows another flow sensor of this invention, which additionally comprises a heating temperature detecting element 22 incorporated in the heating unit 12. The detecting element 22 detects the temperature of the heating element 10 so that the temperature of the heating element 10 can be controlled. As apparent from FIG. 6, the bridge circuit A is constituted by the fluid temperature detecting element 13 and the heating temperature detecting element 22. The heating element 10 is not included in the bridge circuit A.

Other arrangements and advantages of the flow sensor of this example are just the same as those of the previous example described above.

Figure 7:
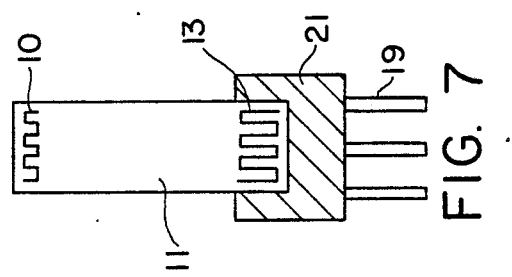
FIG. 7 is a sectional side elevation showing still another flow sensor of this invention.
Figure 8:
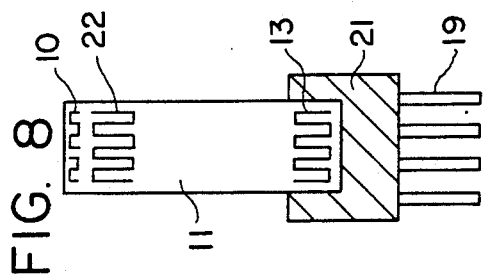
FIG. 8 is a sectional side elevation showing a yet another flow sensor of this invention.
Figure 9:
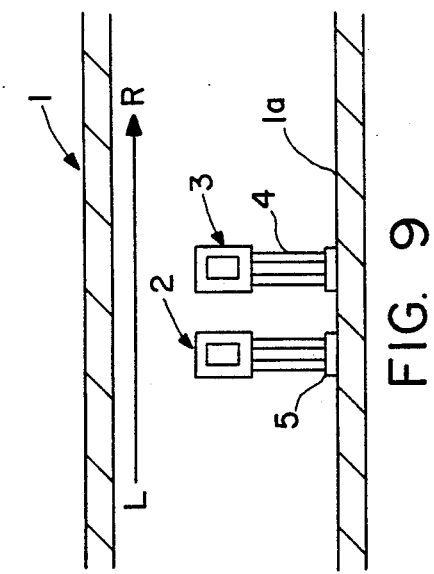
FIG. 9 is a sectional side elevation showing a conventional flow sensor placed within a flow path.
Figure 10:
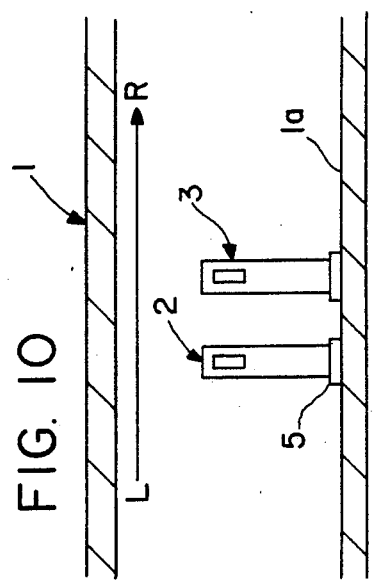
FIG. 10 is a sectional side elevation showing another conventional flow sensor placed within a flow path.

The arrangement of the flow sensor is not limited to those of the above-mentioned examples. In the flow sensor shown in FIGS. 1 and 2, the substrates 11 and 14 can be incorporated into a single substrate. For example, it is possible that the heating element 10 and the fluid temperature detecting element 13 are formed on a single substrate as shown in FIG. 7. In this case, the portion of the substrate 11 corresponding to the area between these two elements is of course insulated against heat because the substrate 11 is made of zirconia. As shown in FIG. 8, the heating temperature detecting element 22 described above can also be incorporated into the substrate shown in FIG. 7.

In the first two examples described above, the two substrates 11 and 14 are both made of zirconia, but zirconia can be used as the material for only one of them.

The above-mentioned examples only disclose platinum as the material for the heating element, the heating temperature detecting element, and the fluid temperature detecting element, but other materials having high resistance temperature coefficients such as platinum alloy, nickel, nickel alloy, thermister, or the like can also be used.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A flow sensor comprising a heating unit and a fluid temperature detecting unit, said heating unit including a first flat substrate, a heating element deposited on the surface of said first substrate, and a heating temperature detecting element for detecting the temperature of said heating element, said heating temperature detecting element being deposited on the surface of said first substrate in the vicinity of said heating element, said fluid temperature detecting unit including a second flat substrate and a fluid temperature detecting element deposited on the surface of said second substrate, at least one of said first and second substrates being made of zirconia.

2. A flow sensor according to claim 1, wherein said zirconia is a pure zirconia or zirconia ceramic.

3. A flow sensor according to claim 2, wherein said zirconia ceramic is stabilized zirconia that is produced by the addition of a stabilizer of $Y_2O_3$, CaO, or MgO, to said pure zirconia.

4. A flow sensor according to claim 2, wherein said zirconia ceramic is partially-stabilized zirconia that is produced by the addition of an amount of a stabilizer of $Y_2O_3$, CaO, or MgO less than the amount of stabilizer needed to produce stabilized zirconia to pure zirconia.

5. A flow sensor comprising a heating unit and a fluid temperature detecting unit, said heating unit including a first flat substrate made of zirconia, a heating element deposited on the surface of said first substrate, and a heating temperature detecting element for detecting the temperature of said heating element, said heating temperature detecting element being deposited on the surface of said first substrate in the vicinity of said heating element, said fluid temperature detecting unit including a second flat substrate made of zirconia and a fluid temperature detecting element deposited on the surface of said second substrate.

6. A flow sensor according to claim 5, wherein said zirconia is a pure zirconia or zirconia ceramic.

7. A flow sensor according to claim 6, wherein said zirconia ceramic is stabilized zirconia that is produced by the addition of a stabilizer of $Y_2O_3$, CaO, or MgO to pure zirconia.

8. A flow sensor according to claim 6, wherein said zirconia ceramic is partially-stabilized zirconia that is produced by the addition to pure zirconia of an amount of a stabilizer of $Y_2O_3$, CaO, or MgO less than the amount of stabilizer needed to produce stabilized zirconia.

9. A flow sensor comprising a flat substrate made of zirconia, a heating element formed on one end of said substrate, and a fluid temperature detecting element formed on the other end of said substrate, said heating element and fluid temperature detecting element being thermally isolated from each other.

10. A flow sensor according to claim 9, further comprising a heating temperature detecting element for detecting the temperature of said heating element, said heating temperature detecting element being formed on said substrate in the vicinity of said heating element.

11. A flow sensor according to claim 9, wherein said zirconia is a pure zirconia or zirconia ceramic.

12. A flow sensor according to claim 11, wherein said zirconia ceramic is stabilized zirconia that is produced by the addition of a stabilizer of $Y_2O_3$, CaO, or MgO to pure zirconia.

13. A flow sensor according to claim 11, wherein said zirconia ceramic is partially-stabilized zirconia that is produced by the addition to pure zirconia of an amount of a stabilizer of $Y_2O_3$, CaO, or MgO less than the amount of stabilizer needed to produce stabilized zirconia.

* * * * *